(12) United States Patent
Grittner et al.

(10) Patent No.: US 9,708,769 B2
(45) Date of Patent: Jul. 18, 2017

(54) SIDE-FEED COATING METHOD

(71) Applicant: tesa SE, Hamburg (DE)

(72) Inventors: Norbert Grittner, Hamburg (DE); Matthias Lehder, Buchholz i.d.N. (DE); Karsten Kuss, Hamburg (DE)

(73) Assignee: TESA SE, Norderstedt (DE)

( * ) Notice: Subject to any disclaimer, the term of this patent is extended or adjusted under 35 U.S.C. 154(b) by 224 days.

(21) Appl. No.: 14/673,019

(22) Filed: Mar. 30, 2015

(65) Prior Publication Data

US 2015/0292157 A1 Oct. 15, 2015

(30) Foreign Application Priority Data

Apr. 14, 2014 (DE) .................. 10 2014 207 141

(51) Int. Cl.
| | | |
|---|---|---|
| *D21G 1/00* | (2006.01) | |
| *B05D 1/26* | (2006.01) | |
| *B05D 1/28* | (2006.01) | |
| *B05C 1/08* | (2006.01) | |
| *B29C 43/24* | (2006.01) | |
| *B29C 43/28* | (2006.01) | |

(52) U.S. Cl.
CPC ............... *D21G 1/006* (2013.01); *B05D 1/26* (2013.01); *B05D 1/28* (2013.01); *B05C 1/0813* (2013.01); *B05C 1/0834* (2013.01); *B05D 2252/00* (2013.01); *B05D 2252/02* (2013.01); *B29C 43/24* (2013.01); *B29C 43/28* (2013.01)

(58) Field of Classification Search
None
See application file for complete search history.

(56) References Cited

U.S. PATENT DOCUMENTS 3,389,045 A 6/1968 William et al.
4,675,230 A * 6/1987 Innes .................... B05C 5/0254
                                                                    118/107
(Continued)

FOREIGN PATENT DOCUMENTS

DE       85 36 141 U1       4/1986
DE       203 11 665 U1      10/2003
(Continued)

OTHER PUBLICATIONS

Office Action issued by the German Patent Office dated Jan. 1, 2015.
(Continued)

*Primary Examiner* — Erma Cameron
(74) *Attorney, Agent, or Firm* — Norris McLaughlin & Marcus P.A.

(57) ABSTRACT

Method for uniform coating of a composition onto a carrier material in web form, through the use of a coating apparatus comprising at least one element A, that forms with a further element B a nip ahead of which the composition is held up, and that moves relative to the element B in such a way that a rotating body of composition is developed and the composition is conveyed into the nip; comprising introduction of the composition into the intake region of the nip, the application of the composition to a carrier material in web form in the nip or after the composition has travelled through the nip, and which limits the longitudinal extent E of the nip intake region fully fillable by the body of composition.

8 Claims, 1 Drawing Sheet

(56) References Cited

U.S. PATENT DOCUMENTS

| | | | | |
|---|---|---|---|---|
| 5,114,753 | A | * 5/1992 | Shibata | B05C 5/0254 118/407 |
| 5,352,322 | A | * 10/1994 | Leverick | A24C 5/472 118/244 |
| 2009/0263626 | A1* | 10/2009 | Fujiwara | B05C 5/0254 428/158 |
| 2014/0030430 | A1* | 1/2014 | Mochizuki | B22F 3/18 427/180 |

FOREIGN PATENT DOCUMENTS

| | | |
|---|---|---|
| DE | 603 16 710 T2 | 7/2008 |
| EP | 0 272 104 A2 | 6/1988 |
| EP | 1 216 759 A2 | 6/2002 |
| GB | 1158890 A | 7/1968 |
| GB | 1190245 A | 4/1970 |
| NL | 7 217 098 A | 6/1973 |
| WO | 02/43879 A1 | 6/2002 |
| WO | 2011/087657 A2 | 7/2011 |

OTHER PUBLICATIONS

European Search Report dated Nov. 27, 2015.
Saint-Eve et al., "Flavored Yogurt Complex Viscosity Influences Real-Time Aroma Release in the Mouth and Sensory Properties" J. Agric. Food Chem. 2006.
J. Mellema et al., "Interpretation of the Complex Viscosity of Dense Hard-Sphere Dispersions", Phys. Rev. A 39, 3696 Apr. 1989.

* cited by examiner

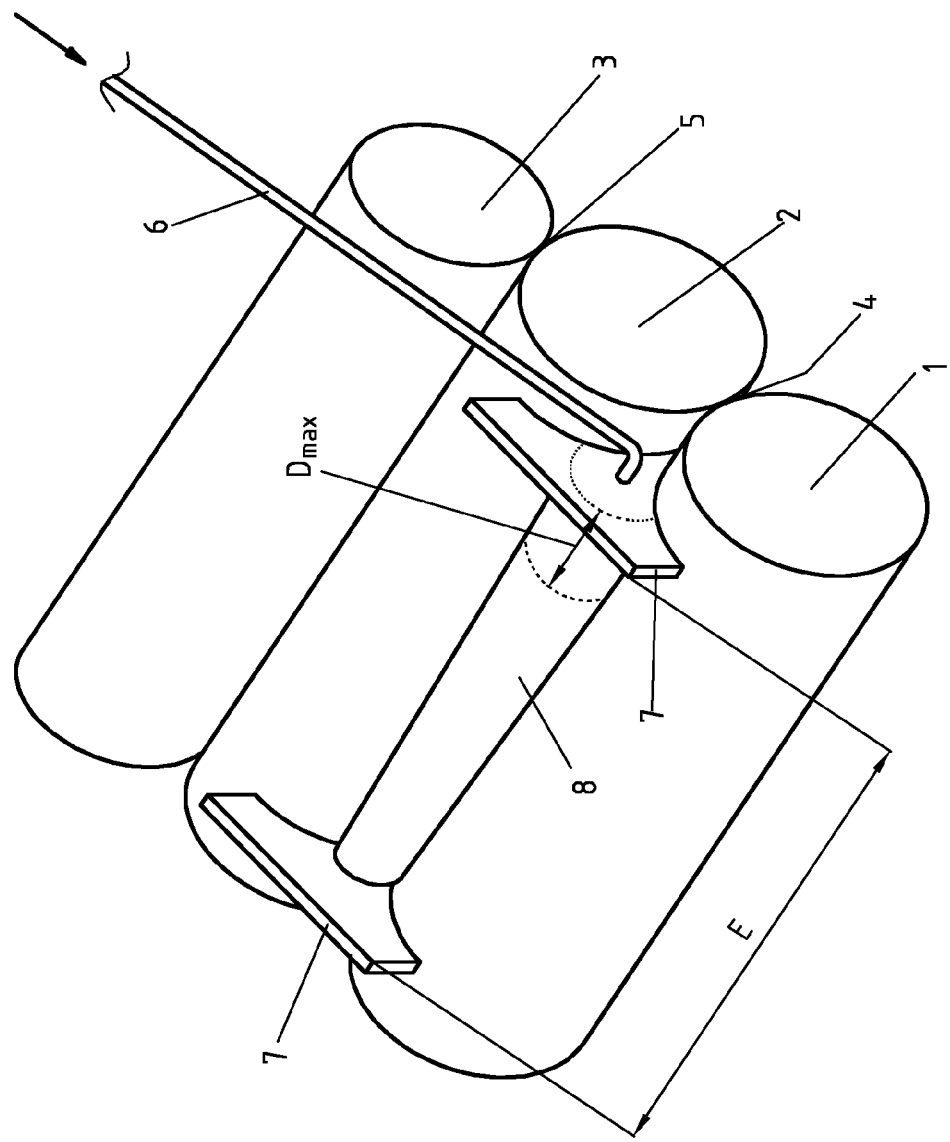

SIDE-FEED COATING METHOD

The invention is situated within the field of the coating of compositions onto carrier materials. Proposed more particularly is a method entailing development of a rotating body of composition, allowing particularly even application of compositions having a rheological profile that changes over time in the course of coating.

BACKGROUND OF THE INVENTION

A problem frequently attending the application of more or less viscous compositions to a carrier material is a change in certain properties, especially rheological properties, of the composition in the course of processing and in particular in the course of application. Such changes may occur as a result, for example, of a temperature change, of an increase in the solids content owing to evaporating solvent, or of the progress of a chemical reaction during application of the composition. These changes in property are almost always a critical parameter for the quality of the coating, especially for the uniformity of the coatweight. Consequently, if the aim is to achieve an even coatweight over the entire coating width, either the state of the composition must be the same across the entire width, or it must be possible for non-uniformities to be specifically compensated during the coating operation.

Application apparatus known in the prior art and producing a rotating body of composition occasionally also called the bank have to date lacked sufficient suitability to counter the problem of viscosity parameters changing during application. With these technologies, instead, the tacit assumption is made that the rheological properties of the material to be coated (composition) are unchanging during the coating operation. In actual fact, however, the composition is generally supplied from a tube or an extruder to the coating assembly at a location in open form, or undergoes rough preliminary distribution by means of distributor pipes, oscillating feeder strips, or slot dies, for example. Finally, the composition is shaped to a precise layer in multi-roll applicators, in calenders or at coating bars or doctor blades, and is transferred to a carrier material, the composition becoming built up at at least one of the distributing doctor blades or rolls. Between rolls at different speeds or between doctor blade and web to be coated, or between doctor blade and rotating roll, a rotating bead of composition is developed, referred to as the body of composition, or alternatively as the bank. Both in the preliminary distribution and in the rotating body of composition, the individual volume elements of the composition are held up for different durations by different pathways, flow profiles and backflows. Changes which occur to different extents locally here in composition properties such as temperature, reaction status or solvent content cannot be compensated, or can be only partly compensated, at the coating assemblies.

Slot dies, for example, having comparatively broad residence time distribution, meaning that the flow of composition at the die edges is much older than in the middle, and rheological changes contingent on chemical reactions have therefore often proceeded further at the edges than in the middle. If, then, the flow of composition is to be coated from a slot die via a calender applicator, the overlapping of different effects in the calender results in further irregularities. Only at the locations at which the skein of composition emerging from the die is thicker than is needed does the excess feed the rotating body of composition. Conversely, at the locations at which the skein of composition is too thin, the absent composition is made up from the rotating body of composition. In the body of composition, then, there is a redistribution of fractions of composition, and this is associated with additional residence time. Optimized preliminary distribution of the composition with the die in fact extends the residence time of the composition in the rotating body of composition, and this residence time may well exceed the pot life. This is the reason why ever-improved regulation of the die lip (automatic die) is unsuccessful, and instead, on the contrary, makes the situation worse. A mathematically perfect preliminary distribution of the composition, which would circumvent this problem, is virtually impossible.

As a result of the overlapping of the two effects, it is impossible overall to calculate the age of the composition transverse to the machine direction in application processes of this kind. The locations at which older composition is coated form thick points within the finished product, known as piston rings, thereby detracting from product quality.

There are a number of examples known in the patent literature for improving the processing of polymer material streams of relatively high viscosity. For instance, GB 1,158,890 B5 describes a 2-roll mill for producing films up to 0.5 mm thick, with supply of composition on both sides, as a cheaper alternative to roll mills having three to four rolls. Here, initial shaping of the layer takes place between the end zones of the rolls; subsequently there is a transfer of the flow of composition into an isolated middle zone of the rolls, by means of "stopping elements", and the film is shaped.

GB 1,190,245 B1 describes a 2-roll mill with unilateral supply of composition for the removal of ethylene glycol from a high-viscosity composition during the production of PET by polycondensation. Here, the continually renewed surface of composition on the hot rotating rolls is utilized for more rapid evaporation of the ethylene glycol.

It is an object of the invention to provide a method for applying a flow of composition to a carrier material that allows even coating to be achieved with formation of a rotating body of composition. Of particular intention is that the coatweight of the applied composition should as far as possible be the same over the entire area to be coated.

The achievement of the object is achieved through the fundamental concept of the invention, whereby the composition is supplied not in the usual way in open form at a location or in roughly predistributed form more or less uniformly on the full width of the web to be coated, by means of distributor tubes, oscillator feeder strips or slot dies, but instead from the side.

SUMMARY OF THE INVENTION

A first and general subject of the invention is therefore a method for coating a composition having a complex viscosity (plate/plate rheometer; 25° C.) of 0.1 Pas (100 rad) to $10^6$ Pas (0.1 rad) onto a carrier material in web form, by means of a coating apparatus which comprises at least one element A, that forms with a further element B a nip ahead of which the composition is held up, and that moves relative to the element B in such a way that a rotating body of composition is developed and the composition is conveyed into the nip; where the method comprises the introduction of the composition via a supply means into the intake region of the nip and also the application of the composition to a carrier material in web form in the nip or after the composition has travelled through the nip, and is characterized in that every exit point of the supply means and every point at which the supplied composition comes into contact with the rotating body of composition is situated directly at the distance or at a distance D from the plane that is orthogonal to the longitudinal extent of the nip and that limits the longitudinal extent E of the nip intake region fully fillable by the body of composition, where D has a maximum value $D_{max}$ which is 10% of the longitudinal extent of the nip intake region fully fillable by the body of composition.

DETAILED DESCRIPTION

As a result of the procedure according to the invention, a substantially conical body is developed. This body feeds itself from the inside out with fresh composition. The onward transport of the composition from the body of composition onto the web to be coated, or onto one of the following rolls, is accomplished advantageously from the outer surface of the rotating body of composition; the composition, so to speak, is peeled off. Consequently, within the body of composition, there is a movement of composition from inside to outside and at the same time axially away from the feed location to the opposite end of the body of composition. In the stable operating state, i.e. when the feed of composition and the departure of composition by flow through the nip are equal and constant in time, this flow within the body of composition has direction and rate that are stable over time within each volume element. A consequence of this, with coating parameters that are otherwise stable over time, is a composition age that is stable over time at each position transverse to the web. At a first approximation, the age of the composition and hence also the progress of the change in viscosity show a linear increase transverse to the web, with each reaction phase being locationally stable. The progress of reaction is spatially resolved transverse to the web as a result of the method.

This provides the precondition for specific, compensatory influencing of the coatweight. Thus, for example, the coating nip can be adjusted unilaterally such that the change in coatweight associated with the progress of the change in viscosity is exactly compensated. As and when necessary, moreover, it is possible to exert a controlled influence over the nip geometry by means of further measures such as axial crossing or roll bending, for example. Because the conditions in the body of composition are stable in time at every location transverse to the web with the method of the invention, the desired transverse profile can now be set durably and precisely by single nip corrections.

The tendency towards local exceedance of pot life within the rotating body of composition is significantly reduced, since composition is not stored at any location within the rotating body of composition. Overall, therefore, the resulting transverse profiles of application weight are superior in terms of their homogeneity to the profiles achievable with conventional supplying of composition, and overall can be managed and set more effectively.

An automatic consequence of the subject of the invention is that a "composition" is understood to be a composition which is fundamentally coatable, in other words sufficiently fluid. More particularly the composition is a composition with changing rheology over time, more particularly during the coating procedure. This means a composition whose rheological properties, in other words its deformation properties and flow properties, undergo change over time, more particularly during the coating procedure. The term refers more particularly to a composition with changing viscosity. The reason for this change may be, for example, the progress of a reaction, a change in temperature or a loss of solvent.

The method of the invention is suitable, for example, for dispersions, solutions and melts, especially polymer melts. The method has proved to be suitable with particular advantage for use in the production of adhesive tapes. Preferably, therefore, the method of the invention is a method for producing an adhesive tape, and the composition is a pressure-sensitive adhesive, more particularly a solvent-free pressure-sensitive adhesive, and very preferably a composition which can be processed as a hotmelt. As already mentioned above, however, solvent-containing compositions or aqueous dispersions are also contemplated.

Suitable carrier material in web form encompasses all known materials which can be used in principle in the method of the invention, examples being films such as polyethylene, polypropylene, polyethylene terephthalate and polyvinyl chloride films, or foamed materials such as polyethylene and polyacrylate foams. Also considered to be carrier material in web form is a release liner, which remains on the composition either temporarily (for production reasons, for example) or until the intended use of said composition. Hence it is possible in accordance with the invention to shape the composition into what is called an adhesive transfer tape (carrier-free adhesive tape) and apply it to a release liner.

The design of the elements A and B of the coating apparatus is in principle arbitrary, subject to the proviso that these two elements form a nip with one another ahead of which the composition for coating can be held up. Element A of the coating system is preferably a rotating roll. More preferably the elements A and B are each rolls, with at least A being a rotating roll; or A is a web for coating and B is a doctor blade; or A is a rotating roll and B is a doctor blade.

Correspondingly, the coating apparatus is preferably a roll calender, a multi-roll applicator, a doctor blade, a roll-over-roll applicator or a polishing stack. With particular preference the coating apparatus is a roll calender. Roll calenders offer the advantage that they are especially suitable for the processing of compositions of relatively high viscosity, such as solvent-free pressure-sensitive adhesives, for example.

The method of the invention envisages in particular the transporting of the composition through the nip between the elements A and B in the coating apparatus. The nip is preferably set so as to impart shape, meaning that the composition is applied directly to the web-form carrier material as it passes through the nip, or at least after passing through the nip is present in the form intended for application to the carrier material, thus having, in particular, the requisite flat shaping. The distance between the two nip-forming elements A and B is the nip width. Running transverse to the web, correspondingly, is the longitudinal extent of the nip.

The nip has an intake region. This refers to the region located immediately ahead of the nip in the flow of composition, and within which the composition comes under the influence of the forces resulting from the narrowing towards the nip and from the interplay of the elements A and B, which move relative to one another, these forces ultimately causing the composition to enter the nip and be transported through it.

The intake region of the nip can be assigned to a region fully fillable by the body of composition and dependent on the specific construction of the coating apparatus and on the specific operating conditions. This region in turn has two edges which delimit its longitudinal extent E, running along the longitudinal extent of the nip; in other words, the distance between these two edges can be equated with the longitudinal extent E of the nip intake region fully fillable by the body of composition, and in accordance with the invention forms the reference variable for $D_{max}$ ($D_{max}$=10% of this distance). Running through each of these edges is a plane that is orthogonal to the longitudinal extent of the nip and that forms the reference plane for the distance of all exit points of the supply means, and of all points at which the supplied composition comes into contact with the rotating body of composition. In accordance with the invention, none of these points may be further than $D_{max}$ away from the closest of these planes to the point in question. This means that the feeding of the composition into the nip, and more particularly into the rotating body of composition, takes place essentially "from the side". The method of the invention therefore differs from the methods known in the prior art, where the feed takes place into the middle of the nip or at least into regions adjacent to the nip middle, or spread over wide regions of the nip. Preferably, every exit point of the supply means and every point at which the supplied composition comes into contact with the rotating body of composition lies in the plane that is orthogonal to the longitudinal extent of the nip and that limits the longitudinal extent E of the nip intake region fully fillable by the body of composition.

In principle it is within the method of the invention for the exit of the supply means to be arranged, in web direction or in machine direction, in the vicinity, preferably in the immediate vicinity, of the nip. Application of the composition to the web well before the nip will generally mean that the composition will be spread transversely over the web even before it reaches the nip intake region, and therefore that one feature of the method of the invention will no longer be complied with: the feature whereby every point at which the supplied composition comes into contact with the rotating body of composition lies at the distance or at a maximum distance $D_{max}$ from the plane that is orthogonal to the longitudinal extent of the nip and that limits the longitudinal extent E of the nip intake region fully fillable by the body of composition. A consequence of that would be the absence of actualization of the advantage, achievable with the invention, whereby stable age conditions prevail at every position transverse to the web. An embodiment in which, in spite of the exit of the composition from the supply means in web direction well ahead of the nip, the distribution of the composition transverse to the web is only within the limits imposed by the method of the invention is, of course, included within the method of the invention.

The limiting of the longitudinal extent E of the nip intake region fully fillable by the body of composition is preferably performed by so-called side limiters. These are elements of the coating apparatus that block off the corresponding side regions of the nip against further longitudinal expansion of the body of composition. They must therefore be largely adapted to the shape of the nip and must bear as closely as possible against the nip-forming elements A and B.

A "supply means" means any device through which there is directed transporting of the composition towards an exit point. This means may be a pipe, a hose or other structures which are open towards substantially one spatial direction and are otherwise spatially enclosed. At the outlet or exit of the supply means, the mass is released in such a way that it moves onto the web and/or into the nip. An "exit point of the supply means" refers to a point in three-dimensional space which is located precisely on the boundary between the space belonging to (and very largely surrounded by) the supply means, and the free space downstream of the supply means (the adjacent space no longer surrounded by the supply means).

With preference every exit point of the supply means lies below the surface of the body of composition. This means that the outlet of the supply means is fully surrounded by the body of composition. The feed of composition realized in this way has the advantageous result that the feed location does not result in marking the coating profile.

At both ends of the longitudinal extent of the nip, there is preferably in each case at least one exit of the supply means, with each exit point of these supply means being at a distance of not more than $D_{max}$ from the plane that is orthogonal to the longitudinal extent of the nip and that limits the longitudinal extent E of the nip intake region fully fillable by the body of composition, or is situated within this plane, and with particular preference is situated within this plane.

Preferably, with the method of the invention, the amount of composition introduced per unit time is not greater than the amount of composition taken off by the coating procedure; in other words, the feed of composition is not greater than consumption of composition by the coating procedure. While the volume of the rotating body of composition is not in principle subject to any limits, an increasing body volume does have the effect of greater radial nip forces, which could bend the nip-forming elements of the applicator apart in the middle and which would therefore have to be compensated. In a large body of composition, moreover, there is substantially more composition stored in a dynamic equilibrium, i.e. the average residence time is greater than in small bodies of composition, and so the risk of pot life exceedance is greater.

BRIEF DESCRIPTION OF THE DRAWING

FIG. 1 illustrated a coating apparatus which can be used with the method of the invention.

FIG. 1 represents by way of example a coating apparatus which can be used in the method of the invention. The apparatus is a 3-roll calender applicator. The applicator comprises rolls 1 (corresponding to nip-forming element B), 2 (corresponding to nip-forming element A) and 3. The composition for coating is passed via the supply means 6 to the nip 4 between rolls 1 and 2. Ahead of the roll nip it is held up, and, because of the rotation of the roll 2 relative to the roll 1, a rotating body 8 of composition is developed, from which the composition is conveyed successively into and through the nip. The nip 4 intake region fully fillable by the body of composition is limited by the two side limiters 7. The respective inside face of the side limiters 7 is therefore situated in the plane that is orthogonal to the longitudinal extent of the nip 4 and that limits the longitudinal extent E of the nip 4 intake region fully fillable by the body of composition. The composition can be taken over by the roll 2 and applied in the roll nip 5 to a carrier material lying on the surface of the roll 3.

EXAMPLE

The composition used for application was a reactive polyacrylate melt with a composition as follows:

| | |
|---|---|
| Acrylate copolymer (EHA/BA/AA 47.5/47.5/5 m %) | 70 m % |
| Tackifier resin (Dertophene ® T110; from DRT) | 30 m % |
| Crosslinker resin (Polypox ® R20; from UPPC AG) | 0.6 m % |
| Activator (Epikure ® 3223; from HEXION) | 0.3 m % |

The coating material in web form that was used was a commercial glassine liner.

Coating took place on a 3-roll L-shaped calender applicator which had the following settings (reference numerals corresponding to FIG. 1):
Coating width: 500 mm, delimited laterally by form-fitting Teflon spatulas running on the roll surfaces of roll nip 1
Mass throughput: 51 kg/h
Density of composition: 1.04 g/cm$^3$
Web speed (roll 3): 17 m/min
Coatweight: 100 g/m$^2$
Surface speed of roll 1 0 m/min
Surface speed of roll 2 3 m/min
Surface speed of roll 3 17 m/min The surface temperatures of the calender rolls were conditioned so as to enable complete transfer of composition to the subsequent roll in the two calender nips 4 and 5. For this purpose, the required temperatures, according to composition rheology and relative roll speed, were around 40-160° C.

The pipe of the composition supply line had an internal diameter of 16 mm and passed through one of the two side spatulas at a location whose depth in the intake region of the nip 4 was such that it lay beneath the surface of the body of composition that developed in operation.

The composition pumped into the roll nip rotated in the direction of the quicker roll 2. In this arrangement, the composition underwent automatic distribution towards the other side spatula, and formed a conical body whose thicker end was located at the feed point. The body could be increased in size by making the feed of composition greater than the consumption by the coating procedure, and vice versa. The smallest possible setting for the body was such that it did not contact the side spatulas opposite the feed location, and instead ran out in a fine point. This location then marked the side edge of the coating on the running web.

The volume of the body of composition was also determined by the relative speed of the two rolls: the greater this speed, the flatter the cone angle of the body, and therefore the smaller its volume became.

The nip between roll 1 and roll 2 was set on the roll bearings in such a way that the originally higher coatweight on the feed side was exactly compensated.

In order to verify the quality of the coating, the applied coatweight of the coated composition was measured continuously by a β-emitter which traversed the entire web width. The findings were as follows:

| Target coatweight | 100 g/m$^2$ |
|---|---|

Determination of standard deviation s by averaging from 3 successive transverse profiles, with 20 measurement points transverse to the web in each case:

| Conventional coating, variant X | s = 2.3 g/m$^2$ |
|---|---|
| Conventional coating, variant Y | s = 2.0 g/m$^2$ |
| Inventive coating: | s = 1.1 g/m$^2$. |

According to variant X, the conventional supply of composition to the calender at nip 4 took place by preliminary distribution of the composition by means of a slot die customary in film extrusion. This die produced a free-hanging curtain of composition that largely filled the nip 4. In this case, a cylindrical body of composition rotating towards the roll 2 was produced in nip 4, and so the curtain of composition was drawn towards the roll 2 and taken in between composition body and roll 2.

According to variant Y, the conventional supply of composition into the calender at nip 4 took place by a pipe mounted centrally above the nip 4, in the form of a string of melt. As in variant X, a body of composition rotating towards the roll 2 and having a diamond-shaped longitudinal section was produced in nip 4, and so the string of composition was drawn towards the roll 2 and taken in between roll 2 and the composition body at the thickest point of said body.

The example shows that the homogeneity of the coatweight over the web to be coated is improved with the method of the invention. A particularly even coatweight was achieved, which is manifested for example in the following advantages:

1. When the coated web was wound up into bales, there were no piston rings, the cause of which are locationally fixed thick points in the distribution of composition. Piston rings in the bale lead to local stretching of the carrier material, leading to poor flat lie of the web when it is unrolled. This in turn leads to problems with further processing, as a result of creasing, for example.
2. Furthermore, when webs with poor and locationally fixed distribution of composition are wound up, a particularly large quantity of entrained air becomes enclosed at thin locations between the plies, and may in turn cause optical defects. Bales produced in accordance with the invention have a virtually cylindrical shape and can therefore be wound without air inclusions; the unrolled web is planar and has a particularly good flat lie.
3. Another possible consequence of piston rings is that the bale evades the very high winding tension at the rings, and undergoes telescoping, so making it unusable for subsequent processing steps. The method of the invention allows the winding of dimensionally stable bales.
4. Thickness is also an important product quality in the application of coated webs, as for example in a preferred use as double-sided adhesive tape. The thickness is utilized, for example, in order to bond components fittingly in precisely defined joints. An inventively improved distribution of composition here allows narrower specification limits and hence greater product quality.
5. The weight of the coating material per unit area is normally a codeterminant of the desired properties of the coating. Particularly uniform coating is therefore a prerequisite for consistent product quality. In the case of pressure-sensitive adhesive tapes, the coatweight directly determines the adhesive properties, such as the bond strength. The method of the invention permits products having particularly consistent adhesive properties.

The invention claimed is:
1. Method for coating a composition having a complex viscosity (plate/plate rheometer; 25° C.) of 0.1 Pas (100 rad) to 10$^6$ Pas (0.1 rad) onto a carrier material in web form by means of a coating apparatus comprising at least one element A, that forms with a further element B a nip ahead of which the composition is held up, and that moves relative to the element B in such a way that a rotating body of composition is developed and the composition is conveyed into the nip,
   comprising
      the introduction of the composition via a supply means into the intake region of the nip, wherein
      every exit point of the supply means and every point at which the supplied composition comes into contact with the rotating body of composition is situated in or at a distance D from the plane that is orthogonal to the longitudinal extent of the nip and that limits the longitudinal extent E of the nip intake region fully fillable by the body of composition, where D has a maximum value $D_{max}$ which is 10% of the longitudinal extent E of the nip intake region fully fillable by the body of composition; and the application of the composition to a carrier material in web form in the nip or after the composition has travelled through the nip.

2. Method according to claim 1, wherein every exit point of the supply means is situated below the surface of the body of composition.

3. Method according to claim 1, wherein at both ends of the longitudinal extent of the nip there is in each case at least one exit of the supply means, where every exit point of these supply means is at a distance of no more than $D_{max}$ from the plane that is orthogonal to the longitudinal extent of the nip and that limits the longitudinal extent E of the nip intake region fully fillable by the body of composition.

4. Method according to claim 1, wherein the amount of composition introduced per unit time is not greater than the amount of composition taken off by the coating.

5. Method according to claim 1, wherein the element A of the coating apparatus is a rotating roll.

6. Method according to claim 1, wherein the coating apparatus is a roll calender, a multi-roll applicator, a doctor blade, a roll-over-roll applicator or a polishing stack.

7. Method according to claim 1, wherein the coating apparatus is a roll calender.

8. Method according to claim 1, wherein the method is a method for producing an adhesive tape and the composition is a pressure-sensitive adhesive.

* * * * *